United States Patent [19]

Williams

[11] 4,433,848
[45] Feb. 28, 1984

[54] LARGE ANNULAR SEGMENTED SEAL WITH LOCK PORTIONS FOR MISSILE LAUNCH TUBE

[75] Inventor: W. Wayne Williams, Westwood, Calif.

[73] Assignee: Westinghouse Electric Corp., Pittsburgh, Pa.

[21] Appl. No.: 451,585

[22] Filed: Dec. 20, 1982

[51] Int. Cl.³ .................... F16J 15/10; F16J 15/32; F41F 3/04

[52] U.S. Cl. .................... 277/199; 277/152; 277/212 F; 277/205; 89/1.816

[58] Field of Search .................... 277/12, 32, 152, 153, 277/192, 199, 205, 212 R, 212 C, 212 F, 212 FB; 220/216-224; 89/1.8, 1.809, 1.81, 1.816

[56] References Cited

U.S. PATENT DOCUMENTS

| 1,698,158 | 1/1929 | Glass | 220/222 |
|---|---|---|---|
| 3,144,255 | 8/1964 | Throne et al. | 277/199 X |
| 3,289,533 | 12/1966 | Brown | 89/1.81 |
| 3,622,737 | 11/1971 | Trudeau | 277/96.1 X |
| 3,857,321 | 12/1974 | Cohen | 89/1.816 X |
| 4,033,593 | 7/1977 | Molnar et al. | 277/214 X |
| 4,172,600 | 10/1979 | Koster et al. | 277/199 |
| 4,308,968 | 1/1982 | Thiltgen et al. | 220/221 X |
| 4,399,999 | 8/1983 | Wold | 277/199 |

FOREIGN PATENT DOCUMENTS 550835  9/1956  Belgium .................... 277/205

Primary Examiner—Robert S. Ward
Attorney, Agent, or Firm—F. J. Baehr, Jr.

[57] ABSTRACT

A segmented seal for a large annular space formed from an annular array of overlapping seal segments having a plurality of said seal segments provided with a bulbous distal end with a hole in the bulbous portion, the hole in adjacent bulbous portions registering to form a continuous opening which receives a tubular member that positively interlocks the ends of the seal segments so that they bridge openings in an outer cylindrical member.

5 Claims, 5 Drawing Figures

… … …

LARGE ANNULAR SEGMENTED SEAL WITH LOCK PORTIONS FOR MISSILE LAUNCH TUBE

GOVERNMENT CONTRACT

The U.S. Government has rights in this invention pursuant to the terms of Contract No. RHO-110203 awarded by the Department of Defense.

CROSS-REFERENCE TO RELATED APPLICATIONS

Applications entitled "A Resilient High Modulus Polyurethane Estima" and "Segmented Annular Seal," both filed by the assignee on Apr. 8, 1982 and assigned Ser. Nos. 366,457 and 366,459 U.S. Pat. No. 4,399,999), respectively, are closely related to this application.

BACKGROUND OF THE INVENTION

This invention relates to a segmented seal and more particularly to a launch seal for a missile having interlock ends that bridge an opening in the launch tube. Launch seals are disposed between a launch tube and a missile and operate to retain the pressure generated by a gas generator utilized to eject the missile from the launch tube. The seal must enclose a relatively large annular opening and withstand pressures in the neighborhood of 300 lbs./sq. in. without inverting or flipping through during the launch.

Additional problems are encountered when the launch tube is to be clean, that is, the shock supports and launch seal are attached to the missile rather than to the launch tube as this complicates loading the missile in the launch tube and requires that the shock pads and launch seal separate from the missile as it exits from the launch tube. Making the seal in segments provides for its separation from the missile, but presents problems as the seal traverses the umbilical cord opening in the launch tube during the initial portion of the launch.

SUMMARY OF THE INVENTION

In general, a seal for a large annular opening, when made in accordance with this invention, comprises a plurality of overlapping seal segments disposed in an annular array. Each seal segment has a base portion, which fits a cylindrical surface and a seal portion extending at such an angle to the base portion to form an acute angle with the base portion on a low pressure side of the seal segment. Each seal portion has side margins with opposing steps, which overlap the steps on adjacent seal portions. The seal also has a plurality of seal portions disposed adjacent each other with a bulbous distal end with a hole in the bulbous end. The holes register with adjacent holes and an elongated member fits into the holes to lock the bulbous ends together.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
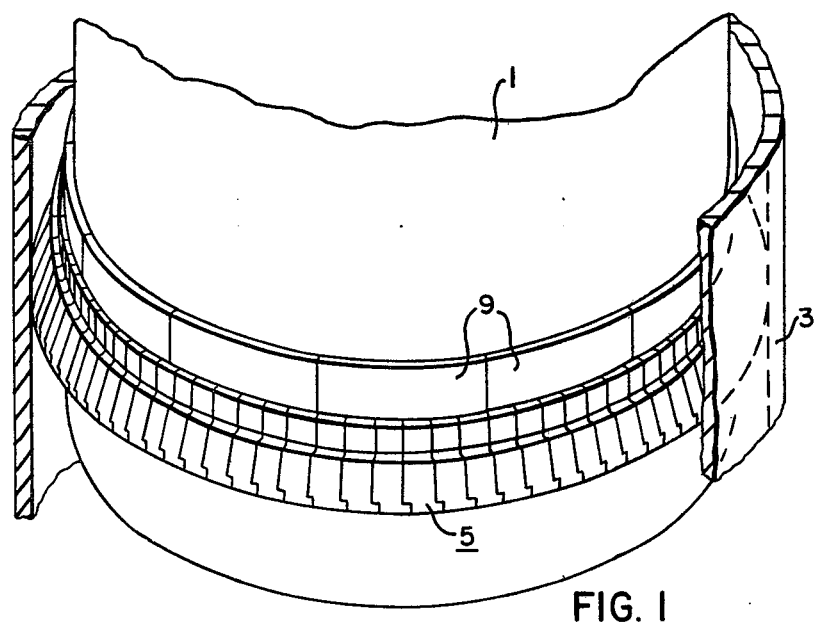
FIG. 1 is a perspective view of a lower end of a missile showing the segmented annular seal.
Figure 2:
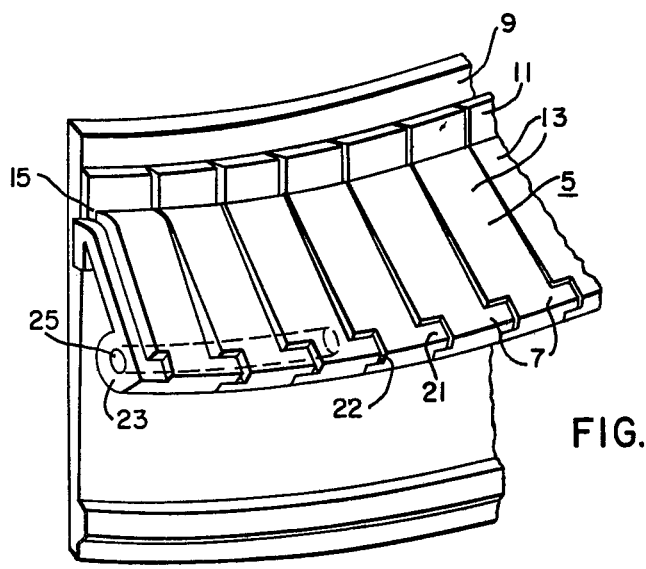
FIG. 2 is an enlarged perspective view of a portion of the segmented seal incorporating this invention.
Figure 3:
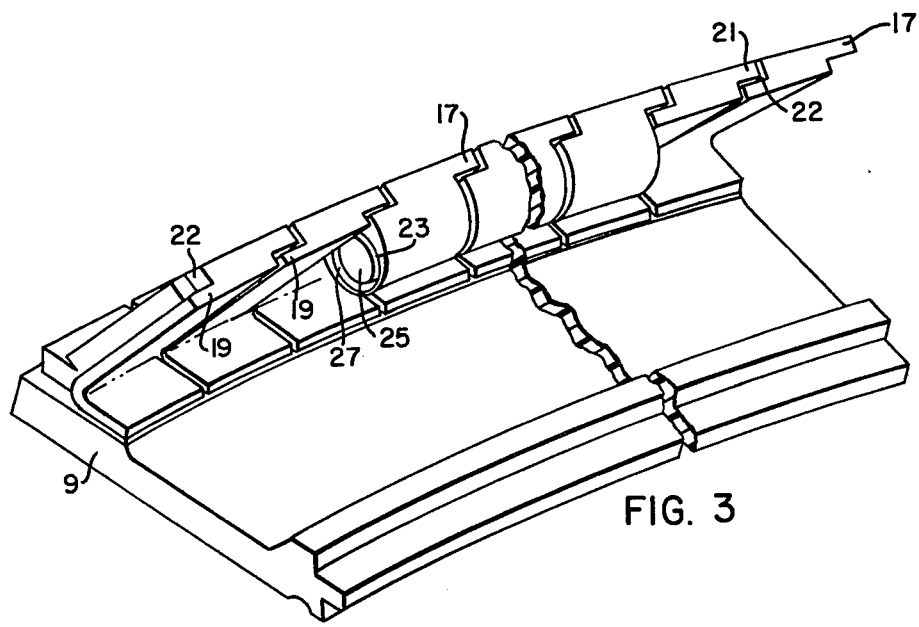
FIG. 3 is an enlarged perspective view of a portion of the segmented seal incorporating this invention.
Figure 4:
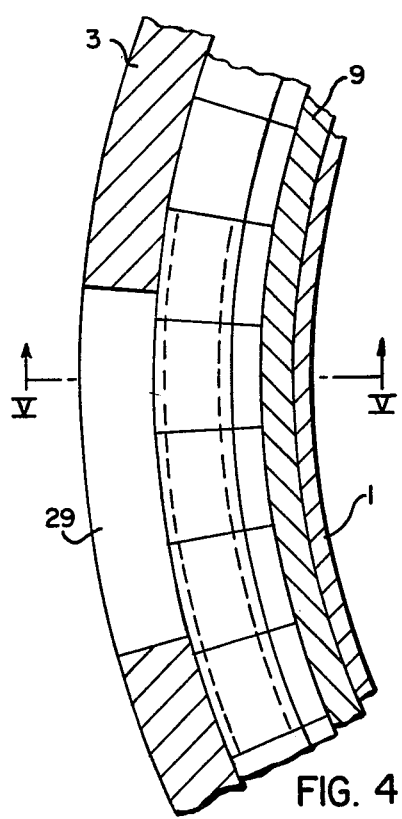
FIG. 4 is a partial sectional view of the launch tube showing the seal and missile.
Figure 5:
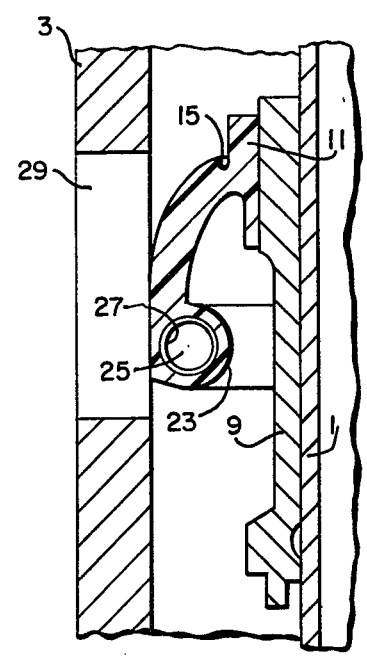
FIG. 5 is a sectional view taken on line V—V of FIG. 4.

Referring now to the drawings in detail and in particular in FIG. 1, there is shown a lower end of a missile 1 disposed in a launch tube 3 with a segmented annular seal 5 disposed on the lower end of the missile 1 to seal the annular space between the missile 1 and launch tube 3.

FIGS. 2, 3, 4 and 5 show the segmented seal 5 in more detail. The segmented seal 5 is shown to comprise a plurality of seal segments 7 disposed in an annular array around the missile 1 to seal the large annular space between the missile 1 and the launch tube 3. The seal segments 7 are affixed to a segmented base plate 9, which fits the missile 1 and is separable therefrom. The seal segments 7 each comprise a base portion 11, which fits the cylindrical base plate 9, and a seal portion 13, which extends from the base portion 11 in such a manner as to form an acute angle with respect to the base portion 11 on the high pressure side of the seal segments 7. A groove 15 is disposed across the low pressure side of the seal portion 13 at the juncture of the seal portion 13 and the base portion 11 forming a unidirectional hinge between the seal portion 13 and base portion 11.

Each seal portion 13 has generally parallel longitudinal side margins with diagonally opposed steps 17 and 19 that overlap when one seal segment 7 is disposed adjacent another. Each seal portion 13 has a protrusion 21 on one distal corner and a notch 22 on the opposite distal corner. The protrusions 21 and notches 22 register when the seal segments 7 are disposed adjacent each other.

The distal end of a plurality of adjacent seal portions 13 have a bulbous portion 23 with a hole or opening 25 disposed therethrough. The openings 25 in adjacent bulbous portion 23 register to form a continuous opening, which will accept an enlongated tubular member 27, which positively interlocks the distal ends of the seal portions so that as the segmented seal 5 passes over an opening in the launch tube, like the umbilical cord opening 29 shown in FIG. 5, the seal segments 7 of the seal do not spring into the opening 29. Only those seal segments, which pass over or adjacent the opening 29, have the positive interlock bulbous ends; thus the seal segments 7 may be separated from the missile after it leaves the launch tube 3.

The segmented seal 5 hereinbefore described provides sufficient flexibility to load the missile from the muzzle end of the launch tube 3 and prevents the seal segments 7 from entering the umbilical opening 29 which tests have shown destroys the seal segments.

What is claimed is:
1. A seal for a large annular opening, said seal comprising:
   a plurality of overlapping seal segments disposed in an annular array;
   each seal segment having a base portion, which fits a cylindrical surface, and a seal portion extending at such an angle to the base portion to form an acute angle with said base portion on a high pressure side of said seal segment;

each seal portion having side margins with diagonally opposing steps, which overlap steps on adjacent seal portions;

a plurality of seal portions disposed adjacent each other and having a bulbous distal end with an opening in the bulbous end which registers with adjacent openings; and an elongated member, which fits into said opening, to positively lock said bulbous ends together.

2. A seal as set forth in claim 1, wherein the openings are generally round.

3. A seal as set forth in claim 2, wherein the elongated member is tubular.

4. A seal as set forth in claim 1 and further comprising a groove extending across the seal portion at the junction of the seal portion and the base portion.

5. A seal as set forth in claim 4, wherein the groove is disposed on a low pressure side of said seal portion.